(12) United States Patent
Boelaars

(10) Patent No.: US 7,306,086 B2
(45) Date of Patent: Dec. 11, 2007

(54) SORTING SYSTEM USING A ROLLER-TOP CONVEYOR BELT

(75) Inventor: Henk W. M. Boelaars, Almere (NL)

(73) Assignee: Laitram, L.L.C., Harahan, LA (US)

( * ) Notice: Subject to any disclaimer, the term of this patent is extended or adjusted under 35 U.S.C. 154(b) by 68 days.

(21) Appl. No.: 10/711,588

(22) Filed: Sep. 27, 2004

(65) Prior Publication Data

US 2006/0070854 A1    Apr. 6, 2006

(51) Int. Cl.
*B65G 13/00* (2006.01)
(52) U.S. Cl. .............................. 193/35 SS; 198/370.1; 198/370.01; 198/370.09; 198/456; 198/457.02; 198/779; 198/782
(58) Field of Classification Search ............... 198/779, 198/782, 456, 457.02, 370.1, 370.01, 370.09; 193/35 SS
See application file for complete search history.

(56) References Cited

U.S. PATENT DOCUMENTS

| | | | |
|---|---|---|---|
| 3,550,756 A | 12/1970 | Kornylak | |
| 3,679,043 A | 7/1972 | Becker | |
| 3,921,789 A * | 11/1975 | Goldinger et al. | 198/369.6 |
| 4,231,469 A * | 11/1980 | Arscott | 198/779 |
| 4,328,889 A * | 5/1982 | Maxted | 198/367 |
| 4,598,815 A * | 7/1986 | Adama | 198/370.09 |
| 4,730,718 A * | 3/1988 | Fazio et al. | 198/370.1 |
| 5,238,099 A * | 8/1993 | Schroeder et al. | 198/456 |
| 5,240,102 A | 8/1993 | Lucas | |
| 5,551,543 A | 9/1996 | Mattingly et al. | |
| 5,564,264 A * | 10/1996 | DeCrane | 53/251 |
| 5,769,204 A | 6/1998 | Okada et al. | |
| 5,984,078 A * | 11/1999 | Bonnet | 198/370.1 |
| 6,044,956 A * | 4/2000 | Henson et al. | 198/370.02 |
| 6,073,747 A | 6/2000 | Taquino et al. | |
| 6,148,990 A | 11/2000 | Lapeyre et al. | 198/779 |
| 6,269,933 B1 | 8/2001 | Schuitema et al. | |
| 6,318,544 B1 * | 11/2001 | O'Connor et al. | 198/853 |
| 6,494,312 B2 * | 12/2002 | Costanzo | 198/779 |

(Continued)

FOREIGN PATENT DOCUMENTS

JP    61124424 A    6/1986

OTHER PUBLICATIONS

European Patent Office, Search Report and Written Opinion of the International Searching Authority of International Application No. PCT/US2005/034796, mailed Feb. 2, 2006.

*Primary Examiner*—Gene O. Crawford
*Assistant Examiner*—Leslie A Nicholson, III
(74) *Attorney, Agent, or Firm*—James T. Cronvich

(57) ABSTRACT

A sorting conveyor system in which a main conveyor is intersected by one or more cross conveyors forming sorting stations at one or more gaps along a main conveying path. The cross conveyor includes a roller-top belt having rollers extending outward of a top article-supporting side and arranged to rotate about axes perpendicular to the main conveying path. The cross conveyor includes a bidirectional drive to selectively advance the roller-top belt in one of two opposite directions to discharge articles transferred onto the cross conveyor in the gap off the side of the main conveying path. The cross conveyor also serves as a low-friction roller-top bridge when the roller-top belt is stopped. The bridge allows articles to cross the gap from an upstream portion of the main conveyor to a downstream portion.

37 Claims, 4 Drawing Sheets

U.S. PATENT DOCUMENTS

| | | |
|---|---|---|
| 6,523,672 B2 | 2/2003 | Greve |
| 6,568,522 B1 | 5/2003 | Boelaars .................. 198/347.2 |
| 6,571,937 B1 * | 6/2003 | Costanzo et al. ........... 198/779 |
| 6,758,323 B2 | 7/2004 | Costanzo |
| 2001/0045346 A1 | 11/2001 | Costanzo |
| 2003/0221932 A1 | 12/2003 | Costanzo |

* cited by examiner

SORTING SYSTEM USING A ROLLER-TOP CONVEYOR BELT

BACKGROUND

The invention relates generally to power-driven conveyors and, more particularly, to sorting systems using roller-top conveyor belts to divert articles from one side or the other of a main conveyor.

In the tire industry, finished tires leave the inspection area in a mix of various types and sizes. Usually the tires are sorted automatically, using bar codes or colored line codes to designate type or size. Transported on a sorting conveyor, the tires are identified by a bar code or color code reader, or sometimes even by a human operator that recognizes the tire type and pushes the appropriate identification button. As soon as an identified tire passes the proper exit of the sorter conveyor for that type of tire, the tire is moved sideways at a 90° angle onto an exit conveyor that conveys the tire to the proper palletizing or storage station. Classical sorting systems use a complex set up of narrow belts and pop-up driven rollers to make the 90° diversion.

Several conventional sorting systems use transverse-roller-top belts in line with a main conveyor. Simple pneumatic or electric pushers push an identified tire off the side of the transverse-roller-top belt onto an exit conveyor. A disadvantage of this system is that it is difficult to transfer tires onto exit conveyors when they are positioned opposite each other across the main conveyor.

Thus, there is a need for a less complex sorting system for tires and other articles.

SUMMARY

This need and other needs are satisfied by a conveyor system embodying features of the invention. In a first version, a conveyor system comprises a main conveyor that conveys articles on an outer conveying surface along a main conveying path. At least one cross conveyor is disposed along the conveying path. The cross conveyor, which intersects the main conveyor, includes a roller-top belt with rollers extending outward of an article-supporting surface of the belt. Axles allow the rollers to rotate about axes that are generally perpendicular to the main conveying path. A drive engages the roller-top belt to advance it along a discharge path generally perpendicular to the main conveying path.

A second version of conveyor system suitable for sorting conveyed articles comprises an upstream conveyor conveying articles along a main conveying path toward a downstream article receiver, which may be another conveyor. The article receiver is aligned with the upstream conveyor, but spaced apart from it along the main conveying path across a gap. A cross conveyor is disposed in the gap between the upstream conveyor and the downstream receiver. The cross conveyor includes a roller-top belt having rollers with axles for rotation of the rollers about axes generally perpendicular to the main conveying path. The cross conveyor also includes a drive that engages the roller-top belt to selectively stop and drive the roller-top belt bidirectionally.

In another aspect of the invention, a conveyor system comprises a downstream conveying surface and an upstream conveying surface separated along a main conveying path by a gap. A cross conveyor in the gap includes a roller-top belt. Salient portions of rollers extend above a top side of the belt to contact conveyed articles received from the upstream conveying surface. Axles allow the rollers to rotate about axes generally perpendicular to the main conveying path.

According to yet another aspect of the invention, a conveyor system for selectively discharging articles comprises a main conveyor conveying articles along a main conveying path. The main conveyor is interrupted by one or more gaps along the main conveying path. One or more cross conveyors intersect the main conveying path at the gap. Each cross conveyor includes a roller-top belt, which has rollers arranged to rotate freely. Articles received from the main conveyor on the roller-top belt are rolled across the gap by the rollers in the direction of the main conveying path. A drive engages the roller-top belt to advance it across the main conveying path to divert articles from the main conveying path.

Another version of conveyor system comprises a main conveyor conveying articles along a main conveying path. One or more gaps along the main conveying path interrupt the main conveyor. A cross conveyor in each gap intersects the main conveying path with a roller-top belt. Rollers in the belt are arranged to receive conveyed articles in the gap from the main conveyor. The roller-top belt may be advanced in at least one direction across the main conveying path. The cross conveyor also includes means for raising and lowering the roller-top belt between a first position and a second higher position. In the first position, a conveyed article is supported by both the roller-top belt and the main conveyor. In the second position, the conveyed article is lifted by the roller-top belt out of contact with the main conveyor.

And, in still another aspect of the invention, a conveyor system comprises a main conveyor conveying articles along a main conveying path. At least one gap interrupts the main conveyor along the main conveying path. A cross conveyor intersects the main conveying path at each gap. The cross conveyor includes a roller-top belt and a drive engaging the roller-top belt. Rollers in the belt are arranged to rotate freely to roll conveyed articles received from the main conveyor across the upstream end of the gap in the direction of the main conveying path. The drive engages the roller-top belt selectively to stop or advance the roller-top belt in either of two directions. While the belt is stopped, a conveyed article rides across the roller-top belt past the gap along the main conveying path. The drive may advance the roller-top belt in a first cross direction along a discharge path to divert a conveyed article from the main conveying path to a first side of the main conveying path. The drive may also advance the belt in an opposite second direction to divert a conveyed article to an opposite second side of the main conveying path.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
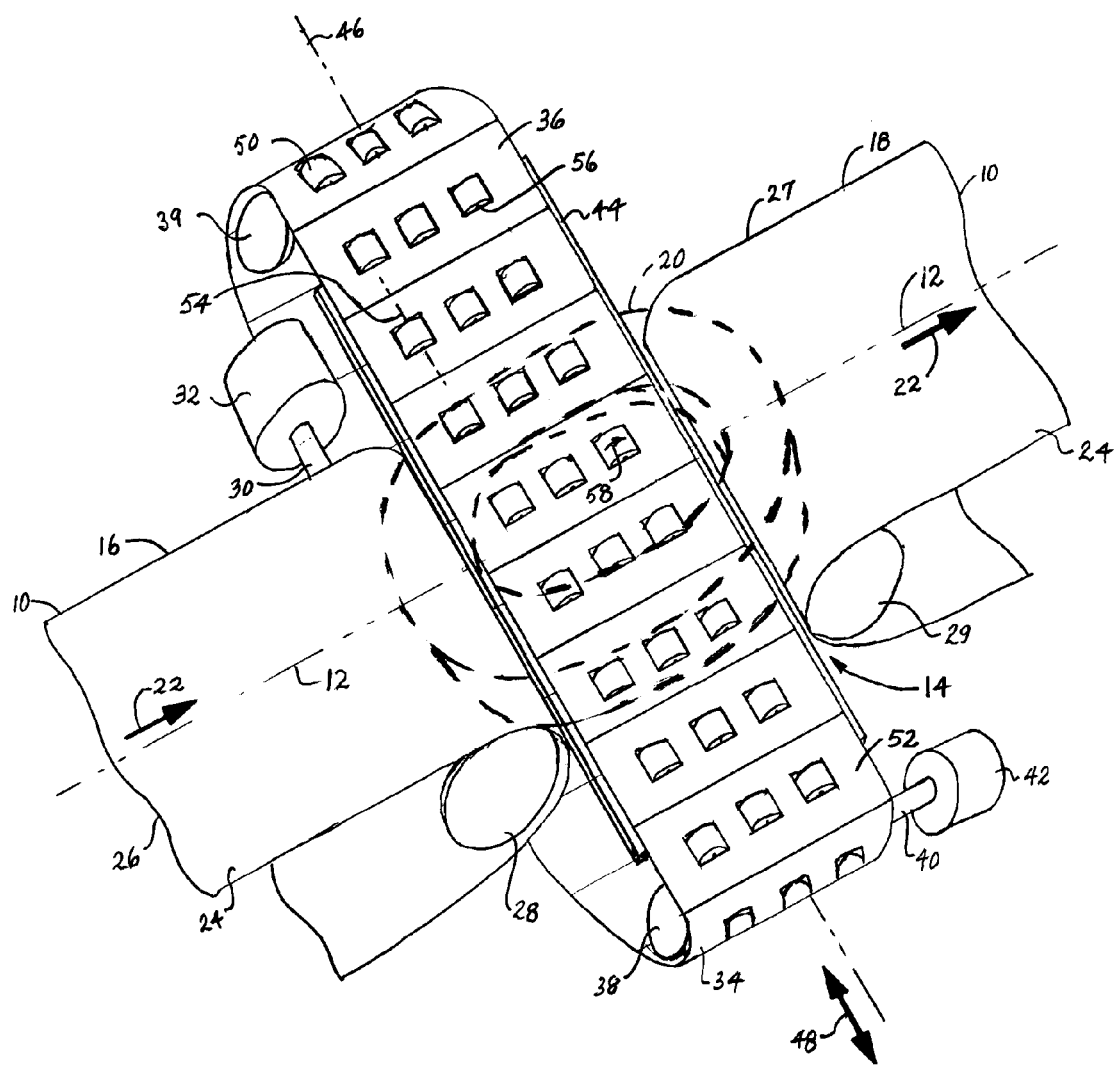
FIG. 1 is an isometric view of a portion of a sorting conveyor system embodying features of the invention.

A conveyor system embodying features of the invention is shown in FIG. 1. A main conveyor 10 defining a main conveying path 12 is interrupted by a gap 14. An upstream conveyor 16 is separated by the gap from a downstream conveyor 18 that receives conveyed articles, such as tires 20, from the upstream conveyor. Articles are conveyed along the main conveying path in the direction of arrows 22 on top article-conveying surfaces 24 of the conveyor. The main conveyor is preferably realized as a belt conveyor. In this example, the upstream conveyor includes a conveyor belt 26 looped around a drum or a sprocket set 28 mounted on a drive shaft 30. A drive motor 32, coupled to the shaft, rotates the sprocket set and drives the upstream belt in the direction of arrow 22. The other end of the upstream belt is looped around an idler shaft and sprocket set (not shown, but similar to that for the downstream conveyor to be discussed now). The downstream conveyor is also preferably a belt conveyor with an endless belt loop 27 extending from an idler sprocket set 29 or drum and shaft at the gap to a shaft and sprocket set at the other end (not shown, but it could include a drive motor as for the upstream conveyor belt). Instead of being separately driven by its own drive motor and shaft, the upstream conveyor can be slave-driven from the downstream conveyor through jackshafts, gears, or pulleys connected between the drive elements of the upstream and downstream conveyors. Although the upstream and downstream conveyors are preferably belt conveyors, they could alternatively be realized as driven-roller conveyors, vibrating conveyors, or drag-chain conveyors, for example.

Figure 3:
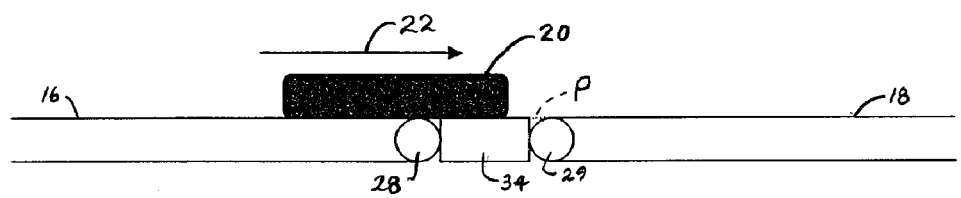
FIG. 3 is a schematic side elevation view of the conveying system of FIG. 1.

A cross conveyor 34 is positioned in the gap 14 between the upstream 16 and downstream 18 portions of the main conveyor to serve as a sorting station. The cross conveyor includes a roller-top conveyor belt 36 wrapped around a drive sprocket set 38 on a drive shaft 40 driven by a motor 42 at one end and an idler sprocket set 39 on a shaft at the other end. The drive motor, shafts, and sprocket sets constitute a drive for the roller-top belt. Preferably, the drive is made bidirectional, as indicated by double-headed arrow 48, by using a reversing motor. Salient portions of rollers 50 extend outward from a top side 52 of the roller-top belt. The rollers are arranged to rotate about axes 54 that are generally perpendicular to the main conveying path 12. Axles 56 define the axes for the rollers and retain them in the belt. A wear surface 44 underlies the roller-top belt along the upper carryway portion of the cross conveyor belt's path 46. Conveyed articles can be diverted from the main conveyor along this discharge path in either of two opposite directions to other conveyors or receiving stations on opposite sides of the main conveying path. The drive can also stop the roller-top belt from advancing. When the roller-top belt is stopped, an article 20 is propelled by the upstream conveyor onto the rollers on the top article-supporting side of the roller-top belt. The rollers rotating freely as indicated by arrow 58 roll the article across the gap in the direction of the main conveying path onto the aligned downstream conveying portion of the main conveyor. As shown in FIG. 3, the article-conveying surfaces of the main conveyor at the gap lie in the same plane P as the top article-supporting side of the cross conveyor. In this way, the roller top belt serves as a low-friction bridge between the upstream and downstream conveying surfaces of the main conveyor.

Figure 2:
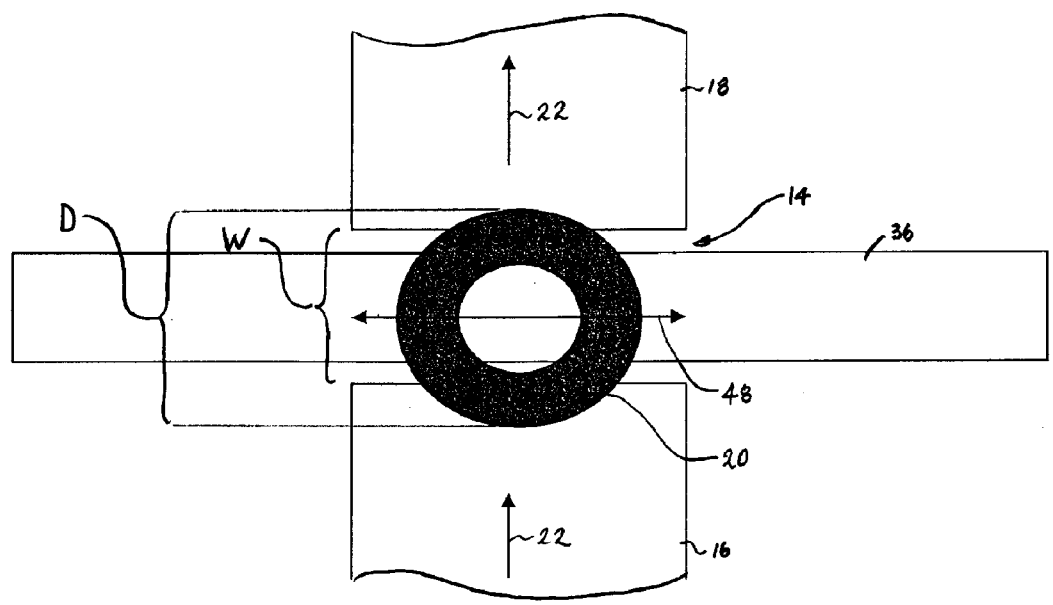
FIG. 2 is a schematic top view of the conveyor system of FIG. 1.

To prevent articles from being stranded on the roller-top belt, the width W of the gap is preferably less than the dimensions D of the footprint of the articles being conveyed, as shown in FIG. 2. In the case of a tire, the critical dimension is its outer diameter. For articles having a more complex shape, the critical dimension must be determined to prevent articles from being stranded.

Although the main conveyor may be realized by a variety of conveyors, the cross conveyor is realized as a roller-top belt conveyor. And, preferably, the roller-top belt is a modular plastic conveyor belt, such as the Series 400 Transverse Roller Top belt manufactured and sold by Intralox, L.L.C. of Harahan, La., USA. Modular plastic conveyor belts are constructed of rows of molded plastic belt modules connected end to end by hinge pins through interleaved hinge eyes between consecutive rows of belt modules. In the Intralox Series 400 roller-top belt, the rollers are plastic rollers with a central bore through which a stainless steel axle is received. The ends of the axle are embedded in the interior of the module and retain the roller rotatably in place in a module cavity. Although modular plastic conveyor belts are preferred, flat rubber or fabric belts may also be used in the invention.

Figure 4A:
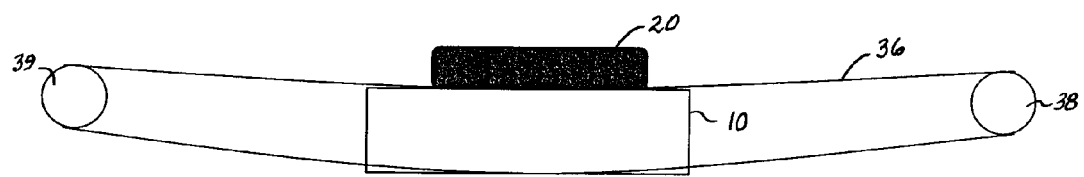
FIG. 4A is a schematic front elevation view of a conveying system as in FIG. 1, showing the further feature of lifting and raising a cross conveyor, in a lowered position.
Figure 4B:
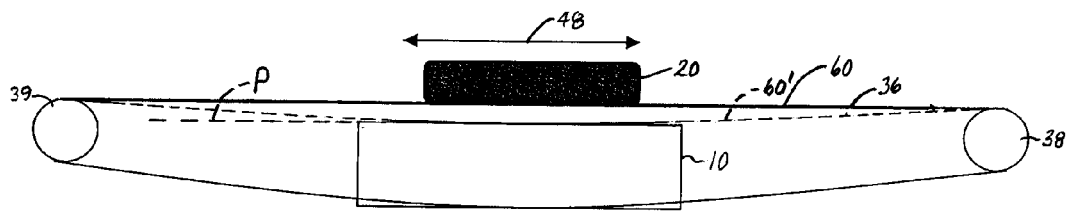
FIG. 4B is a schematic view as in FIG. 4A with the cross conveyor in a raised position.

When the cross conveyor is activated to divert articles off one side of the main conveyor or the other, it is undesirable for the conveyed article to be in contact with the article-conveying surface of the main conveyor as the article is being diverted. This is especially true in the case of articles made of high-friction materials, such as tire rubber. As shown in FIG. 4A, an article 20 conveyed along the main conveyor 10 transfers across the gap over the bridge formed by the roller-top belt 36. The sprocket sets 38, 39 about which the roller-top belt is looped are positioned on opposites sides of the main conveyor. When the roller-top belt is stopped, there is no pull, or tension, in the belt. The weight of the article transferred onto the roller-top belt causes it to sag until it lowers to a position to sit on a wear surface 44 (FIG. 1). As shown in FIG. 4B, when the belt is driven in either direction to divert articles off the main conveyor, the top article-supporting side of the cross conveyor belt rises from a first lower position 60' to a second higher position 60. As the belt 36 is driven in either direction 48, belt pull, or tension, in the belt increases. The increased tension takes up the sag in the top carryway portion of the belt and causes it to follow more closely a tangent line between the outer peripheries of the two sprockets 38, 39, which are elevated with respect to the plane P of the outer article-conveying surfaces of the main conveyor. Consequently, the cross conveyor belt is in a lower position to bridge the gap when the cross conveyor belt is not running and in a higher position lifting the conveyed article off the main conveyor when the cross conveyor belt is advancing to discharge articles off the side of the main conveyor. Thus, the elevated sprockets and the drive system constitute means for raising and lowering the roller-top belt.

Figure 5A:
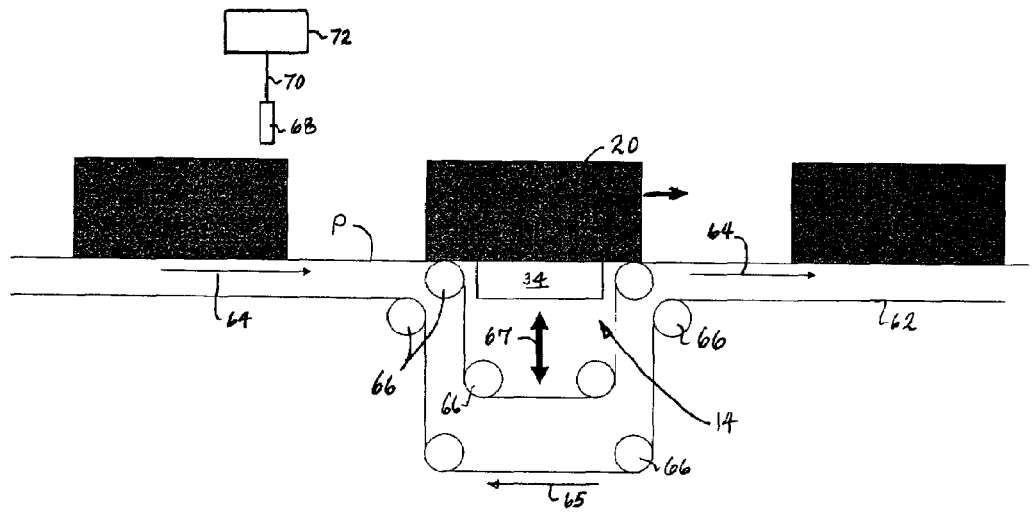
FIGS. 5A and 5B are schematic side elevation views of another version of conveying system embodying many of the features of FIG. 1 and illustrating the features of a single main conveyor belt and a lift for raising and lowering a cross conveyor relative to the main conveyor in a first lowered position and in a second raised position.
Figure 5B:
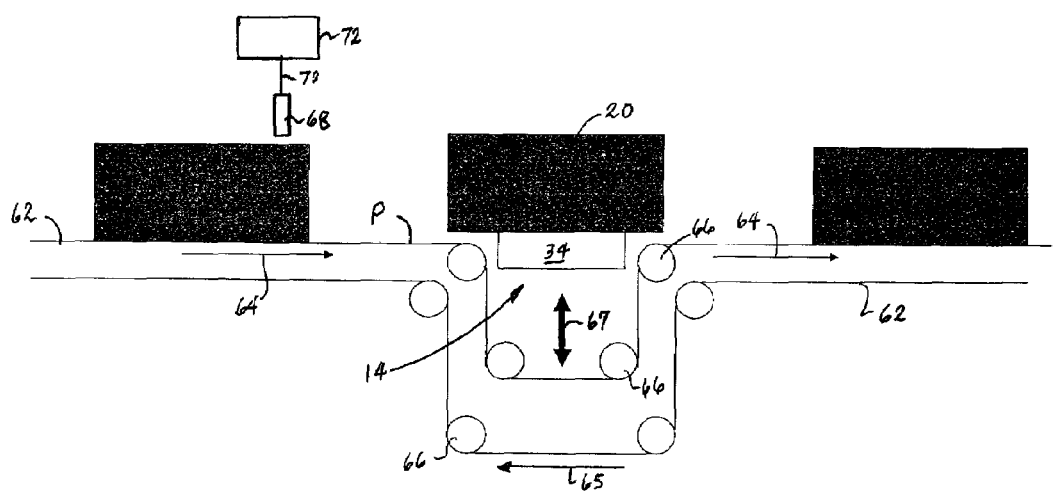

FIGS. 5A and 5B show another version of the conveyor system with a differently configured main conveyor. In this version, the main conveyor is formed of a single conveyor belt 62 following an upper carryway path 64 and a lower returnway path 65. Conventional sprockets, rollers, and shoes (66, generally) are used to guide the main conveyor belt along its path. The top carryway portion of the main conveyor upstream of the gap 14 serves as an upstream conveyor, and the downstream top carryway serves as a downstream conveyor. In the gap, the main conveyor belt resides below the cross conveyor 34. In this way, a single belt with a single drive can be used in the main conveyor. The cross conveyor can be configured as in FIGS. 4A and 4B with the sprockets elevated to allow the cross conveyor belt to assume a lower position as in FIG. 5A to allow the article to transfer across the gap and stay on the main conveyor or a raised position as in FIG. 5B to divert articles off the main conveyor to either side of the belt without frictional contact with the main conveyor. A lift mechanism, indicated by arrow 67, and realized as a pneumatic or hydraulic piston, for example, could alternatively be used to actively raise and lower the cross conveyor relative to the main conveyor in coordination with the cross conveyor belt drive. As FIGS. 5A and 5B further show, a sensor 68 is positioned along the main conveying path to sense one or more characteristics of a conveyed article. For example, the sensor could be a proximity switch that detects the presence of an article approaching the gap by a signal sent over a signal line 70 to a controller 72, such as a programmable logic control or other intelligent controller. The controller controls the activation of the cross conveyor drive to stop the cross conveyor belt or drive it in one of two opposite directions. The sensor or other sensors could also or alternatively be optical sensors, bar code readers, RFID sensors, or other sensing devices capable of sensing specific characteristics of the conveyed article to control the sorting of articles transferred onto the cross conveyor.

Although the invention has been described in detail with respect to a few preferred versions, other versions are possible. For example, the main conveyor may include more than one gap to allow for many cross conveyor sorting stations. As another example, if stranding is not a problem, the gap width need not be less than a critical dimension of the footprint of a conveyed article. And the cross conveyor need not be perpendicular to the main conveyor, but could define a discharge path at some oblique angle to the main conveying path. As yet another example, a stationary article receiving station can replace a downstream conveyor in receiving articles conveyed over the cross conveyor. Furthermore, to avoid the problem of friction by rubbing contact between a conveyed article and the main conveyor during article diversion, the main conveyor can include a roller-top belt with transverse rollers along which conveyed articles can roll as they are being discharged toward the side. So, as these few examples suggest, the scope of the claims is not meant to be limited to exemplary versions described in detail.

What is claimed is:

1. A conveyor system comprising:
    a main conveyor conveying articles on an outer conveying surface along a main conveying path;
    at least one cross conveyor disposed along the main conveying path and intersecting and passing through the main conveyor, the cross conveyor including:
        a roller-top belt having a plurality of rollers extending outward of an outer article-supporting surface and having axles for rotation of the rollers about axes generally perpendicular to the main conveying path to direct first preselected articles atop the rollers along the main conveying path, and
        a drive engaging the roller-top belt to advance the belt along a discharge path generally perpendicular to the main conveying path and convey second preselected articles atop the rollers along the discharge path; and
    means for selectively raising and lowering the roller-top belt relative to the main conveyor.

2. A conveyor system as in claim 1 wherein the drive is a bidirectional drive that drives the belt in opposite directions to divert articles selectively off the main conveying path along the discharge path.

3. A conveyor system as in claim 1 wherein the main conveyor comprises a series of endless belt loops along the main conveying path separated by a gap sized to admit the cross conveyor between consecutive belt loops.

4. A conveyor system as in claim 1 wherein the main conveyor comprises a belt extending along the main conveying path, the belt's outer article-conveying surface defining a conveying plane along a major portion of the main conveying path and disposed below the cross conveyor along a minor portion of the main conveying path.

5. A conveyor system as in claim 1 wherein the main conveyor includes a gap along the main conveying path at a cross-conveyor position, the gap being wide enough to admit the cross conveyor and narrow enough for a conveyed article to span the gap.

6. A conveyor system as in claim 1 wherein the outer conveying surface of the main conveyor defines a conveying plane along a major portion of the main conveying path and wherein the drive for the roller-top belt includes sprocket sets on opposite sides of the main conveyor about which the roller-top belt is looped and supported with the outer article-supporting surface slightly above the main conveying plane when the drive is driving the roller-top belt.

7. A conveyor system as in claim 1 wherein the cross conveyor further includes a wear surface for the roller-top belt beneath the outer article-supporting surface of the roller-top belt wherein the wear surface is positioned to support the roller-top belt with its outer article-supporting surface positioned relative to the outer conveying surface of the main conveyor to receive from the main conveyor conveyed articles atop the rollers when the roller-top belt is stopped.

8. A conveyor system as in claim 1 wherein the cross conveyor further includes a wear surface for the roller-top belt positioned beneath the outer article-supporting surface of the roller-top belt and wherein the drive includes sprockets on opposite sides of the main conveyor about which the roller-top belt is looped, wherein the sprockets are elevated relative to the wear surface so that a tangent line between an outer periphery of a sprocket on one side of the main conveying path and an outer periphery of a sprocket on the opposite side lies above the support surface.

9. A conveyor system as in claim 1 further comprising sensors for sensing characteristics of the conveyed articles and for activating the drive to move the roller-top belt in one direction or the other depending on a predetermined characteristic of an article at the gap.

10. A conveyor system comprising:
    an upstream conveyor conveying articles along a main conveying path;
    a downstream article receiver aligned with the upstream conveyor and forming part of the main conveying path and spaced apart from the upstream conveyor across a gap to receive articles from the upstream conveyor across the gap;
    a cross conveyor disposed in the gap between the upstream conveyor and the downstream article receiver and intersecting and passing through the main conveying path, the cross conveyor including:
        a roller-top belt having a plurality of rollers having axles for rotation of the rollers about axes generally perpendicular to the main conveying path, and a drive engaging the roller-top belt to selectively stop and advance the roller-top belt bidirectionally across the main conveying path along the gap; and means for selectively raising and lowering the roller-top belt relative to the upstream conveyor and the downstream article receiver;

wherein first preselected articles atop the rollers are directed by the rotation of the rollers from the upstream conveyor to the downstream article receiver when the roller-top belt is stopped and wherein second preselected articles atop the rollers are conveyed across the main conveying path when the roller-top belt is advancing.

11. A conveyor system as in claim 10 wherein the upstream conveyor and the downstream article receiver are belt conveyors.

12. A conveyor system as in claim 10 wherein the upstream conveyor and the downstream article receiver comprise a continuous conveyor belt following a belt path coincident with the main conveying path in the upstream conveyor and the downstream article receiver and disposed beneath the roller-top belt in the gap.

13. A conveyor system as in claim 10 wherein the upstream conveyor, the downstream article receiver, and the roller-top belt include upper article-supporting surfaces generally coplanar with each other at the gap.

14. A conveyor system as in claim 10 wherein the means for selectively raising and lowering the roller-top belt is coordinated with the drive in order to raise the roller-top belt above the upstream conveyor and the downstream article receiver when the drive is activated to advance the roller-top belt across the main conveying path along the gap.

15. A conveyor system as in claim 10 wherein the means for selectively raising and lowering the roller-top belt comprises a wear surface supporting an upper surface of the roller-top belt from below and a lift that raises and lowers the support surface.

16. A conveyor system as in claim 10 wherein the width of the gap from the upstream conveyor to the downstream article receiver is less than the dimensions of the footprint of the conveyed articles so that the conveyed articles can span the gap.

17. A conveyor system as in claim 10 further comprising a sensor for sensing a characteristic of the conveyed articles and for activating the drive to advance the roller-top belt in one direction or the other depending on a predetermined characteristic of an article at the gap.

18. A conveyor system as in claim 10 wherein the cross conveyor further includes:

a wear surface positioned in the gap to support the roller-top belt and articles conveyed atop its rollers when the roller-top belt is not being driven; and sprocket sets on opposite sides of the main conveying path about which the roller-top belt is looped, the sprockets being elevated relative to the support surface to raise the roller-top belt above the support surface when the roller-top belt is being driven.

19. A conveyor system comprising:

a downstream conveying surface;

an upstream conveying surface conveying articles toward the downstream conveying surface along a main conveying path extending along the upstream and downstream conveying surfaces, the upstream conveying surface being separated from the downstream conveying surface across a gap;

a cross conveyor disposed in the gap and intersecting and passing through the main conveying path and including a roller-top belt having rollers with salient portions extending above a top side of the belt to contact conveyed articles received from the upstream conveying surface and direct preselected articles atop the rollers to the downstream conveying surface, the rollers having axles for rotation of the rollers about axes generally perpendicular to the main conveying path; and means for selectively raising and lowering the roller-top belt relative to the upstream conveying surface and the downstream conveying surface.

20. A conveyor system as in claim 19 wherein the cross conveyor includes a bidirectional drive engaging the roller-top belt for advancing the roller-top belt in opposite directions generally perpendicular to the main conveying path.

21. A conveyor system as in claim 20 further comprising sensors for sensing characteristics of the conveyed articles and for activating the drive to advance the roller-top belt in one direction or the other depending on a predetermined characteristic of an article at the gap.

22. A conveyor system as in claim 19 wherein the upstream conveying surface and the downstream conveying surface are at a first level at the gap and wherein the roller-top belt is movable from a first position wherein the salient portions of the rollers are at the first level to a second position wherein the salient portions are at a second level higher than the first level.

23. A conveyor system as in claim 22 wherein the cross conveyor further includes a wear surface supporting the roller-top belt below the top side when the roller-top belt is in the first position.

24. A conveyor system as in claim 22 wherein the roller-top belt is in the higher second position as it advances and in the first position when it is stopped.

25. A conveyor system as in claim 19 wherein the gap between the upstream and downstream conveying surfaces is less than the diametric dimensions of the footprints of conveyed articles.

26. A conveyor system as in claim 19 comprising a conveyor belt having a top surface forming the upstream and the downstream conveying surfaces.

27. A conveyor system for selectively discharging articles comprising:

a main conveyor conveying articles along a main conveying path and interrupted by one or more gaps along the main conveying path;

one or more cross conveyors intersecting and passing through the main conveying path at the one or more gaps, each cross conveyor including:

a roller-top belt having a plurality of rollers arranged to rotate freely to roll first preselected articles atop the rollers received from the main conveyor across the gap in the direction of the main conveying path, and a drive engaging the roller-top belt to advance the roller-top belt across the main conveying path to divert second preselected articles atop the rollers away from the main conveying path; and means for selectively raising and lowering the roller-top belt relative to the main conveyor.

28. A conveyor system as in claim 27 wherein the drive is a bidirectional drive selectively advancing the roller-top belt in opposite directions generally perpendicular to the main conveying path to discharge articles in opposite directions.

29. A conveyor system as in claim 27 wherein the roller-top belt further includes axles for the rollers defining axes of rotation generally perpendicular to the main conveying path.

30. A conveyor system comprising:
a main conveyor conveying articles along a main conveying path and interrupted by one or more gaps along the main conveying path;
one or more cross conveyors intersecting and passing through the main conveying path at the one or more gaps, each cross conveyor including:
a roller-top belt capable of advancing in at least one direction across the main conveying path and having a plurality of rollers arranged to receive conveyed articles in the gap from the main conveyor and to rotate freely in the direction of the main conveying path, and
means for raising and lowering the roller-top belt between a first position wherein a first preselected conveyed article is supported atop the rollers by both the roller-top belt and the main conveyor and a second higher position lifting a second conveyed article supported atop the rollers on the roller-top belt out of contact with the main conveyor.

31. A conveyor system as in claim 30 wherein the means for raising and lowering comprises sprocket sets on opposite sides of the main conveying path about which the roller-top belt is looped, the sprockets being elevated relative to the main conveyor to raise the roller-top belt to the higher second position when the roller-top belt is being driven and to allow the roller-top belt to sag into the lower first position when the roller-top belt is stopped.

32. A conveyor system as in claim 31 wherein the weight of a conveyed article on the roller-top conveyor belt when stopped lowers the roller-top belt to the first position.

33. A conveyor system as in claim 31 wherein each cross conveyor includes a wear surface disposed in the gap on which the roller-top belt sits when stopped and supporting a conveyed article.

34. A conveyor system as in claim 30 wherein the rollers are arranged to rotate freely about axes generally perpendicular to the main conveying path to direct articles received from the main conveyor downstream back onto the main conveyor when the roller-top belt is stopped.

35. A conveyor system comprising:
a main conveyor conveying articles along a main conveying path and interrupted by at least one gap along the main conveying path;
at least one cross conveyor intersecting and passing through the main conveying path at a gap, each cross conveyor including:
a roller-top belt having a plurality of rollers arranged to rotate freely to roll first preselected articles received from the main conveyor across the upstream end of the gap in the direction of the main conveying path, and
a drive engaging the roller-top belt to selectively stop the roller-top belt to allow a first preselected conveyed article to ride across the roller-top belt on the rollers past the gap along the main conveying path, advance the belt in a first cross direction along a discharge path diverting a second preselected conveyed article atop the rollers away from the main conveying path to a first side of the conveying path, and advance the belt in an opposite second cross direction along the discharge path diverting a third preselected conveyed article atop the rollers away from the main conveying path to an opposite second side of the conveying path; and
means for selectively raising and lowering the roller-top belt relative to the main conveyor.

36. A conveyor system as in claim 35 further comprising a sensor for sensing a characteristic of a conveyed article and coupled to the drive for de-activating the drive to stop the roller-top belt or for activating the drive to advance the roller-top belt in the first direction or the second direction depending on a predetermined characteristic of the conveyed article, whereby the cross conveyor allows a conveyed article to continue along the main conveying path or diverts the conveyed article along the discharge path to the first side or the second side of the main conveying path.

37. A method for diverting articles from a main conveyor conveying articles along a main conveying path, the method comprising:
operating a roller-top conveyor belt having rollers arranged to rotate on axes generally perpendicular to the main conveying path as a bidirectional cross conveyor intersecting and passing through a main conveyor to divert articles from the main conveyor by bidirectionally driving the roller-top conveyor belt in either opposite direction to convey the articles atop the rollers on the roller-top conveyor belt to receiving stations on opposite sides of the main conveyor;
raising the roller-top conveyor belt relative to the main conveyor above the level of the main conveyor when the roller-top conveyor belt is being driven to convey articles atop the rollers to either receiving station.

* * * * *